(12) United States Patent
Wishneusky

(10) Patent No.: US 7,685,320 B1
(45) Date of Patent: Mar. 23, 2010

(54) AUTONOMOUS SEQUENCING AND FAULT SPREADING

(75) Inventor: John A. Wishneusky, Austin, TX (US)

(73) Assignee: Zilker Labs, Inc., Austin, TX (US)

(*) Notice: Subject to any disclaimer, the term of this patent is extended or adjusted under 35 U.S.C. 154(b) by 0 days.

(21) Appl. No.: 11/435,629

(22) Filed: May 17, 2006

Related U.S. Application Data

(63) Continuation-in-part of application No. 11/198,698, filed on Aug. 5, 2005, application No. 11/435,629, which is a continuation-in-part of application No. 10/820,976, filed on Apr. 8, 2004, now Pat. No. 7,506,179.

(60) Provisional application No. 60/599,369, filed on Aug. 6, 2004, provisional application No. 60/462,414, filed on Apr. 11, 2003.

(51) Int. Cl.
*G06F 3/00* (2006.01)
*G05F 1/40* (2006.01)

(52) U.S. Cl. .......................... 710/3; 323/282; 323/222; 714/22; 713/340

(58) Field of Classification Search ................ 323/282, 323/222; 713/300, 340; 710/120, 3, 305; 714/22
See application file for complete search history.

(56) References Cited

U.S. PATENT DOCUMENTS

| | | | |
|---|---|---|---|
| 5,117,430 A | 5/1992 | Berglund | |
| 5,646,509 A | 7/1997 | Berglund et al. | |
| 5,675,480 A | 10/1997 | Stanford | |
| 5,935,252 A | 8/1999 | Berglund et al. | |
| 6,079,026 A | 6/2000 | Berglund et al. | |
| 6,199,130 B1 * | 3/2001 | Berglund et al. | ............ 710/302 |

(Continued)

FOREIGN PATENT DOCUMENTS

WO    WO 02/31943 A2    4/2002

OTHER PUBLICATIONS

"The I2C-Bus Specification Version 2.1", Jan. 2000, pp. 1-48.*
V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

(Continued)

*Primary Examiner*—Niketa I Patel
*Assistant Examiner*—Ernest Unelus
(74) *Attorney, Agent, or Firm*—Meyertons Hood Kivlin Kowert & Goetzel, P.C.; Jeffrey C. Hood

(57) ABSTRACT

A power management system may be configured to allow digital information relating to the power management functions of sequencing and fault spreading to be passed between POL regulators using a standard multi-master multi-slave interface such as I²C bus interface or SMBus interface. POL regulators may be configured via pin strapping, and coupled to a serial data bus where they may monitor bus transactions initiated by other similar POL regulators. Each POL regulator may respond to the bus transactions initiated by other POL regulators according to its configuration, and may perform a variety of tasks associated with sequencing and fault spreading in addition to regulating its own voltage output. When configured with a standard multi-master/multi-slave interface such as an I²C bus interface or SMBus interface, the POL regulators may report information to multiple other POL regulators while maintaining compatibility with non-POL devices also connected to the bus.

21 Claims, 6 Drawing Sheets

U.S. PATENT DOCUMENTS

| | | | |
|---|---|---|---|
| 6,262,900 B1 | 7/2001 | Suntio | |
| 6,396,167 B1 | 5/2002 | Simburger et al. | |
| 6,470,382 B1* | 10/2002 | Wang et al. | 709/220 |
| 6,563,294 B2* | 5/2003 | Duffy et al. | 323/283 |
| 6,754,720 B1* | 6/2004 | Packer | 710/3 |
| 6,788,035 B2* | 9/2004 | Bassett et al. | 323/272 |
| 6,915,440 B2 | 7/2005 | Berglund et al. | |
| 6,936,999 B2 | 8/2005 | Chapuis | |
| 6,944,686 B2* | 9/2005 | Naruse et al. | 710/39 |
| 6,949,916 B2* | 9/2005 | Chapuis | 323/282 |
| 6,965,502 B2* | 11/2005 | Duffy et al. | 361/18 |
| 7,000,125 B2* | 2/2006 | Chapuis et al. | 713/300 |
| 7,049,798 B2* | 5/2006 | Chapuis et al. | 323/282 |
| 7,080,265 B2* | 7/2006 | Thaker et al. | 713/300 |
| 7,206,944 B2* | 4/2007 | Odaohhara et al. | 713/300 |
| 7,365,661 B2* | 4/2008 | Thomas | 341/117 |
| 7,459,892 B2* | 12/2008 | Chapuis | 323/282 |
| 2001/0007118 A1* | 7/2001 | Matsuda | 710/129 |
| 2003/0070020 A1* | 4/2003 | Kondo et al. | 710/120 |
| 2004/0093533 A1 | 5/2004 | Chapuis et al. | |
| 2004/0123164 A1* | 6/2004 | Chapuis et al. | 713/300 |
| 2004/0123167 A1* | 6/2004 | Chapuis | 713/300 |
| 2004/0255070 A1* | 12/2004 | Larson et al. | 710/305 |
| 2005/0200344 A1* | 9/2005 | Chapuis | 323/282 |
| 2006/0172783 A1* | 8/2006 | Leung et al. | 455/572 |
| 2006/0172787 A1* | 8/2006 | Ellis et al. | 463/1 |

OTHER PUBLICATIONS

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; http://www.cd4power.com/data/apnotes/acan-02.pdf; 92 pages.

James P. Earle; "IPMI/IMPB Satellite Controller Test Procedure" (Application Guide); C&D Technologies, Inc.; www.cdpowerelectronics.net/products/appnotes/acan04.pdf; 12 pages.

"How to Design Battery Charger Applications that Require External Microcontrollers and Related System-Level Issues"; Dallas Semiconductor; www.maxim-ic.com/appnotes.cfm/appnote_number/680; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; http://focus.ti.com/lit/an/slva069/slva069.pdf; May 1999; 12 pages.

"HDX-600P Hot Swap—600 Watts—1U High"; Switching Power, Inc.; www.switchpwr.com/hdx-600p.pdf; 2 pages.

"HDSX-600P: I2C Serial Bus Interface (for IPMI implementation):"; Switching Power, Inc.; www.switchpwr.com/I2C.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; Twentieth International Telecommunications Energy Conference (INTELEC); 1998; pp. 345-348.

"SPI—APPNOTES: Alarm & Monitoring Signals"; Switching Power Inc.; 2 pages; www.switchpwr.com/alarm_signals.pdf.

"TDA8020HL Dual Smart Card Interface—Objective Specification v4.2—Data Sheet"; Feb. 24, 2001; 22 pages; Philips Semiconductors.

Chrisotphe Chausset; "Application Note—TDA8020HL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; www.ednmag.com.

H. Taylor and L.W. Hruska; "Standard Smart Batteries for Consumer Applications" Proceedings of the Tenth Annual Battery Conference on Applications and Advances; Jan. 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; http://focus.ti.com/lit/ds/symlink/tps54680.pdf.

"Programmable Four-Channel Step-Down DC/DC Converter"; Texas Instruments Incorporated; 2005;16 pages; http://focus.ti.com/lit/ds/symlink/tps54900.pdf.

"LNBH21—LNB Supply and Control IC with Step-up Converter and I2C Interface" (Datasheet); Apr. 2004; 20 pages; STMicroelectronics; www.st.com/stonline/products/literature/ds/9890.pdf.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I2C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997-Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); SUMMIT Microelectronics, Inc.; www.summitmicro.com/prod_select/summary/sms66/SMS66DS.pdf; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; http://pdfserv.maxim-ic.com/en/ds/MAX1647-MAX1648.pdf; 25 pages; Sunnyvale, CA, U.S.A.

Ron Vinsant, John Difiore and Richard Clarke; "Digitally-controlled SMPS extends power system capabilities"; Powerconversion & Intelligent Motion; 1994; pp. 30-37; vol. 20, No. 6.

* cited by examiner

AUTONOMOUS SEQUENCING AND FAULT SPREADING

CONTINUATION-IN-PART

This application is a continuation-in-part of U.S. patent application Ser. No. 11/198,698 filed Aug. 5, 2005 and titled "Method for Using a Multi-Master Multi-Slave Bus for Power Management", whose inventors are Kenneth W, Fernald, James W. Templeton, and John A. Wishneusky, and which claims benefit of priority of U.S. provisional application Ser. No. 60/599,369 filed Aug. 6, 2004 and titled "Method For Using A Multi-Master Multi-Slave Bus For Power Management".

This application is additionally a continuation-in-part of U.S. patent application Ser. No. 10/820,976 filed Apr. 8, 2004 now U.S. Pat. No. 7,506,179 and titled "Method And Apparatus For Improved DC Power Delivery, Management And Configuration", whose inventor is James W. Templeton, and which claims benefit of priority of U.S. provisional application Ser. No. 60/462,414 filed Apr. 11, 2003 and titled "Method And Apparatus For Improved DC Power Delivery, Management And Configuration".

U.S. patent application Ser. No. 11/198,698, U.S. provisional application Ser. No. 60/599,369, U.S. patent application Ser. No. 10/820,976, and U.S. provisional application Ser. No. 60/462,414 are all hereby incorporated by reference as though fully and completely set forth herein.

BACKGROUND OF THE INVENTION

1. Field of the Invention

This invention relates generally to power systems, and DC power delivery, management and configuration. More specifically, the invention provides a system and method for event based sequencing and fault spreading in power management systems.

2. Description of the Related Art

Power supply design has become a much more critical and difficult task than it was a few years ago. High-current/low-voltage ICs typically require a very clean and stable source of DC power. The power source must be capable of delivering very fast current transients. The electronic path to these loads must also have low resistance and inductance (for example, a 1.5V supply would be completely dropped across a 25 mΩ resistance at 60 Amps). Power distribution in complex systems is often accomplished by distributing a high-voltage, low-current power source to a set of local direct-current to direct-current (DC-DC) converters. These converters, typically known as point-of-load (POL) devices and/or POL regulators (also referred to as POLs or POL converters), convert the higher voltage to a level more appropriate for the load or multiple loads that require power. Generally, each POL may be configured to generate a different voltage potential or multiple POLs may be configured to generate the same voltage potential. POLs generating the same voltage potential may be designed to drive separate loads. Similarly, two or more POLs may be connected in parallel to drive one or more common loads.

In systems that utilize multiple POL regulators, it is common for the POL regulators to exchange information in order to implement necessary power management features. Typical power management features include voltage tracking, load balancing, sequencing, phase spreading, clock synchronization, as well as many other functions not enumerated here. With the rising complexity and robustness requirements of many systems, the ability to monitor and control the power distribution sub-system has become increasingly more critical. Traditionally, information exchanged by POL regulators has been represented by analog voltage and/or current signals. There are, however, several advantages to representing the exchanged information as digital data that may be transferred across a bus interconnecting all related POL devices. Monitoring of power distribution sub-systems has typically been implemented via a standard digital interface coupling the major components of the power distribution system to a host microprocessor (or more generally, a Local Controller). The digital interface may allow the Local Controller to continuously monitor the health of the power system. It may also control the power system in order to implement system-level features such as standby and sleep modes.

One example of a digital interface that is well suited for such applications is the I²C (Inter-IC) bus. The I²C bus is a multi-master, multi-slave, two-wire bus that offers support for any device on the bus to access any other device. Transactions on the I²C bus typically consist of a start event, a destination slave address, a read/write bit, and a variable number of data bytes. The transactions are generally terminated by a stop event or another start event. The data byte immediately following the destination slave address may be interpreted as a command or tag byte, which identifies the nature and/or type of the packet. FIG. 1 shows the basic packet structure of a packet 100 that may be representative of communication packets used with a multi-master multi-slave bus, such as the I²C bus. Packet 100, which may contain data to be transferred or written to a slave device, may include a start bit "S" 20 signaling the beginning of the communication from the master. This may be followed by a unique slave address byte "ADR" 22, with the most significant bit (MSB) coming first. The subsequent Read/Write bit 24, typically the eighth bit overall, following "S" 20, specifies whether the slave is to receive (typically a '0' value) or to transmit (typically a '1' value). Read/Write bit 24 may be followed by an acknowledge bit "A" 26 issued by the receiving device, acknowledging receipt of the previous byte.

The transmitting device (slave or master, as indicated by the Read/Write bit) may then transmit a data byte 34 starting with the MSB. In the example packet of FIG. 1, the slave device is to receive and the first byte following slave address byte 22 is a command byte "CMD" 34 sent by the master device. At the end of the byte, the receiving device may issue a new "A" 28. This 9-bit pattern may be repeated until all the required bytes have been transmitted, in this case Data1 36 and Data2 38, and a respective acknowledge bit following each byte. In a write transaction, as illustrated in FIG. 1, when the master device is done transmitting, it may monitor the last acknowledge bit, that is, "A" 32, then issue a stop condition "P" 40. In a read transaction (slave device transmitting), the master device may not acknowledge final byte 38, thereby indicating to the slave device that the slave device's transmission is completed. The master device may then issue "P" 40.

FIG. 2 shows a typical configuration in which multiple POL regulators 102, 104, and 106 are coupled together via I²C bus 120 comprising data signal (SDA) line 124 and clock signal (SCA) line 122, which also couples a Local Controller 108 and other devices 110, 112, and 114 that are not POL regulators. Each of attached devices 102, 104, 106, 110, 112, and 114 must be responsive to a unique address, which is its respective slave address. The slave address may be defined for a device or programmed into a device in several possible ways. For example, the address may be "hard wired" into the device by design. Alternatively, the address may be determined by the connections of one or more pins on a device, with the one or more pins dedicated to selecting the address to which the device will respond. In yet another configuration, the device may contain non-volatile memory into which the slave address as well as other configuration information may be programmed during manufacturing or during a configuration operation performed to prepare the device for use in a particular system or application.

During operation, Local Controller 108 would typically address each POL regulator and/or other device, by using that POL regulator's or device's unique slave address as required, writing control information and reading status and data. FIG. 3 is a simplified illustration of a packet being transferred from Local Controller 108 to POL regulator 104. Each of the devices on shared I²C bus 120 will receive the packet sent by Local Controller 108. However, only POL regulator 104 would recognize the address at the start of the packet as its own. POL regulator 104 would thus respond to the packet initiated by Local Controller 108, receiving or supplying data as required.

FIG. 4 shows the basic bus waveforms on the shared SDA (410 and 412), and SCL (414) bus wires. The bus connections of each device connected to the bus are typically of an "open-drain" nature, with an external pull-up device, generally a resistor or current source (not shown), on each shared signal wire. Each device connected to the bus has the ability to drive the signals to a low or logic 0 level or to not drive it at all. If no device is "pulling" the bus low, the external pull-up typically causes the bus signal to remain at a high or logic 1 level. Also illustrated in FIG. 4 are, a transmission start event 402 corresponding for example to "S" bit 20 in FIG. 1, the MSB through LSB of a slave address byte corresponding to "ADR" 22, an acknowledge event 404 corresponding to "A" bit 26, followed by a data byte corresponding to Data2 38, and a stop event 406 corresponding for example to "P" bit 40.

Another bus standard, developed after the I²C bus standard, is the SMBus (System Management Bus), which is backward compatible with the I²C bus standard while introducing additional features to support error detection, hazard recovery, and dynamic address assignment among others. It should be noted that both the I²C bus and the SMBus have predefined means for identifying a slave or destination device, but neither has predefined means for identifying the master or source of a bus transaction, a feature that is oftentimes required for POL regulators to communicate with each other. The information transfer requirements of several common power management features implemented among POL regulators will now be presented below.

It is a common requirement that the POL regulators in a system enable and disable their power outputs in a predefined order, or sequence. This has commonly been called "sequencing", and refers more generally to orderly turn-on and turn-off for a group of POL regulators, one following the other in a prescribed order, which is typically necessary to avoid both temporary and permanent interference with the operation of the system. The order is typically configured by defining, for a given device, an optional prequel device—a device that must turn on before the given device turns on—and an optional sequel device—a device that must turn off before the given device turns off. The sequencing is traditionally accomplished by connecting a "POWER GOOD" (PG) output pin of each POL regulator to an "ENABLE" (EN) input pin of the next POL regulator to be enabled. This is illustrated in FIG. 5, where the PG pin of POL regulator 202 is coupled to the EN pin of POL regulator 204, while the PG pin of POL regulator 204 is coupled to the EN pin of POL regulator 206. Each POL regulator may assert its PG pin when the output of the POL regulator has met some predefined condition or reached some predefined state. This event may then allow the next POL regulator to enable its output followed by asserting its own PG pin.

One power management function that is also related to sequencing is fault spreading. Fault spreading refers to a group of POL regulators collectively shutting down upon one or more POL regulators in the group detecting a hardware fault. Part of fault spreading also typically includes the POL regulators collectively retrying operation once all the POL regulators that have detected a hardware fault have transmitted indication of their ability to begin operating again, as determined by the POL regulators' own configuration and fault response programming. The operation is typically retried in accordance with the sequencing configuration of the POL regulators. For example (referring again to FIG. 3 as an example of a power management system containing POL regulators coupled together via a bus), local controller 108 may access the POL regulators using respective addresses assigned to the POL regulators for explicit prequel and sequel device addresses to establish sequencing relationships among devices. This fault spreading is a serial process usable only within a sequencing chain, and may not work for devices that are not part of a sequencing chain, and/or devices configured in different sequencing chains.

In such a configuration, fault spreading becomes dependent on the echoing of recognized fault event transmissions in order to reach devices in the chain that are distant from the fault originating device's direct sequel/prequel device relationships. It usually limits fault spreading to an individual sequencing chain and to only those devices within a chain that have a sequel or prequel device. This generally requires limiting the echoing of recognized fault event transmissions in order to avoid endless echoes, but makes it very hard for a chain to recognize and process multiple faults. Serial fault spreading generally adds substantial and uncertain delays. In many cases the latencies on the bus can be long enough for echoed faults to be recognized by the device with a primary hardware fault, interfering with that device's own retry attempt. The device may not be able to identify whether the recognized fault event transmission is a new fault found elsewhere in the chain, or the echo of its own fault. There is usually no proper way to apply the fault response and retry the count of a primary hardware fault to the faulted chain as a whole. Furthermore, a head-of-chain device without dependency on a sequel-device for power down sequencing would typically not be able to participate with recognized faults in fault spreading, which may necessitate defining a fault spreading address with no sequencing function.

Other corresponding issues related to the prior art will become apparent to one skilled in the art after comparing such prior art with the present invention as described herein.

SUMMARY OF THE INVENTION

In one set of embodiments of a power management system comprising POL (point of load) regulators coupled together via a bus, fault spreading may not be restricted by a serial sequencing configuration, and may handle multiple device faults and fault responses. The POL regulators may implicitly coordinate their operations through monitoring event (status) descriptions that are transmitted as packets of data on the shared bus, (e.g. a serial bus such as I²C or SMBus). The packets may contain status information of the sending, or transmitting POL regulator, without being explicitly addressed to another POL regulator. The packets may not explicitly command another POL regulator to take any specific action. Rather, each POL regulator may make decisions autonomously, based upon knowledge of its own state and the status information being transmitted by other POL regulators onto the shared bus.

In one set of embodiments, a power management system may be configured to allow digital information relating to the power management functions of sequencing and fault spreading to be passed between POL regulators using a standard multi-master multi-slave interface such as I$^2$C bus interface or SMBus interface. POL regulators may be configured using program pins via pin strapping, and coupled to a serial data bus where they may monitor bus transactions initiated by other similar POL regulators. According to their configurations, each POL regulator may respond to the bus transactions initiated by other POL regulators, and may perform a variety of tasks associated with sequencing and fault spreading in addition to regulating its own output voltage. When coupled to a standard multi-master multi-slave interface such as an I$^2$C bus interface or SMBus interface, the POL regulators may report information to multiple other POL regulators while maintaining compatibility with non-POL regulators also connected to the bus.

In one embodiment, as an alternative to the dedicated analog signal connections traditionally used for communication between POL regulators, each POL regulator is configured to generate an event on the shared bus, in which the POL regulator generating the event both identifies itself to the other POL regulators coupled to the bus, and transmits status and monitoring information associated with sequencing and fault spreading. The POL regulators on the same bus may be equally configured to monitor the bus for sequencing and/or fault spreading events, and respond to the events according to the requirements inherent within sequencing and/or fault spreading. Each POL regulator may be configured via pin strapping according to the functionality desired from the POL regulator. Pursuant to its configuration, once the POL regulator is coupled to the bus, it may operate without requiring further control from a local controller or from any of the other POL regulators. Each POL regulator may be configured according to a system plan or system considerations corresponding to the overall power management system, the POL regulators thereby forming a POL regulator network capable of performing the necessary tasks to enable event based sequencing and fault spreading.

In one embodiment, information is distributed to multiple POL regulators coupled to the shared bus by one of the POL regulators identifying itself as a master POL regulator, which may effectively transmit the information to itself. By performing a bus write in which a given POL regulator may send the packet to its own address, the source of the information may be identified by any slave POL regulator configured as part of an address group to which the master POL regulator also belongs. It should be noted that identifying a given POL regulator as a master POL regulator does not imply control of other POL regulators by the given (master) POL regulator. Instead, it is indicative of the given POL regulator's current designation as a bus master by virtue of its originating a transmission. Similarly, the term "slave POL regulator" may simply refer to POL regulators that are currently monitoring the bus for transactions and are not currently transmitting information, but are not in effect controlled by a transmitting master POL regulator. In other words, a master POL regulator may be acting as the bus master to initiate/make a transmission, and remain a peer to other POL regulators while making information available to a group of designated POL regulators. The master POL regulator may not actually behave as a master with respect to the other (slave) POL regulators insofar as it may not actively control the other (slave) POL regulators.

In actuality, those skilled in the art may note that in the terminology of certain buses, for example the SMBus, a transmitting device—such as the given POL regulator designated as a master POL regulator above—may simply be regarded as a slave device addressed by its own transmission.

In general, slave POL regulators that may require the information contained in the packet transmitted by a master POL regulator may receive the information from the bus. Therefore, in addition to having its own respective assigned bus address, each POL regulator may be assigned or configured with one or more additional addresses, which may define one or more POL regulator groups enabling specialized group data exchange that may be required by sequencing and fault spreading. The additional address, addresses, or address groups may be used to receive monitoring information transmitted onto the bus by a POL regulator acting as bus master, and to recognize the identity of that bus master POL regulator. Such configuration or configurations are compatible with normal features of shared buses such as the I$^2$C and System Management Bust (SMBus), and other similar buses.

Fault events transmitted by any POL regulator that belongs to a designated address group may be recognized and managed in a fault event vector configured within each POL regulator that belongs to the designated address group. In one set of embodiments, each bit in the vector may represent a member of the designated address group. When a POL regulator that's a member of the designated address group transmits a fault event, the bit corresponding to the transmitting POL regulator may be set in the vector. When a POL regulator transmits a retry event, the bit corresponding to the POL regulator is cleared in the vector. If any bit in the vector is set, the POL regulators in the designated address group may shut down until the vector is cleared. In one set of embodiments, a POL regulator detecting a primary hardware fault may transmit its fault status onto the bus. All POL regulators in the group may monitor all packets transmitted by other POL regulators from the same group, thereby eliminating the need to echo faults to spread them along a chain. Limiting fault spreading to a sequencing chain may therefore also be eliminated. The address group may be defined to be large enough to include all POL regulators that were designated to spread faults mutually. There may be multiple sequencing chains (or no chains) within the address group. In one set of embodiments, a given sequencing chain may be part of a single group.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
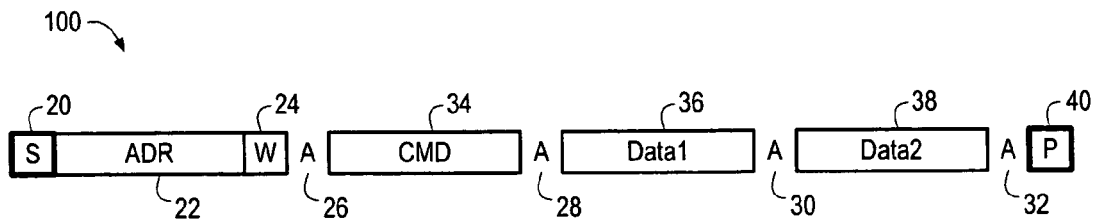
FIG. 1 shows the basic packet structure of a I$^2$C packet according to prior art.
Figure 2:
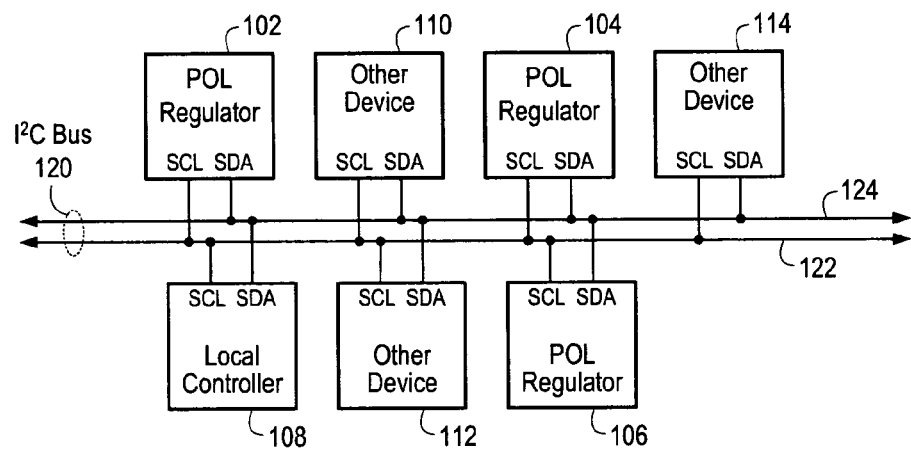
FIG. 2 shows a typical system configuration with POL and non-POL regulators and a local controller coupled to an I$^2$C bus, according to prior art.
Figure 3:
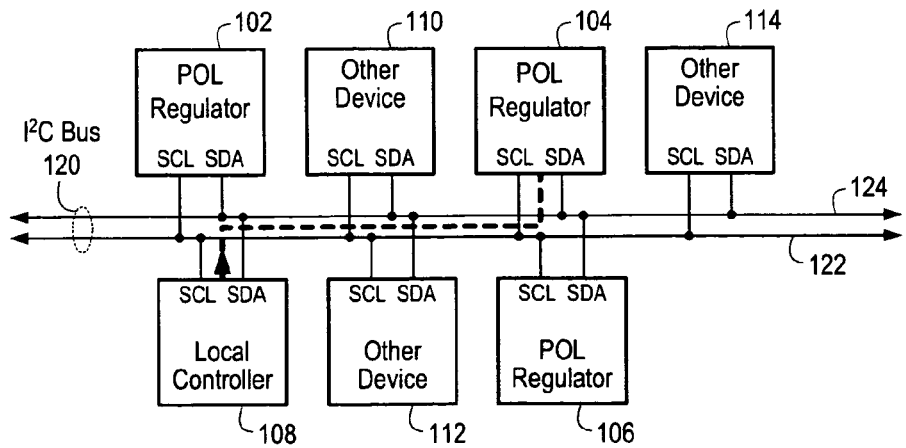
FIG. 3 illustrates a simplified transfer of a packet from a Local Controller to a POL regulator, according to prior art.
Figure 4:
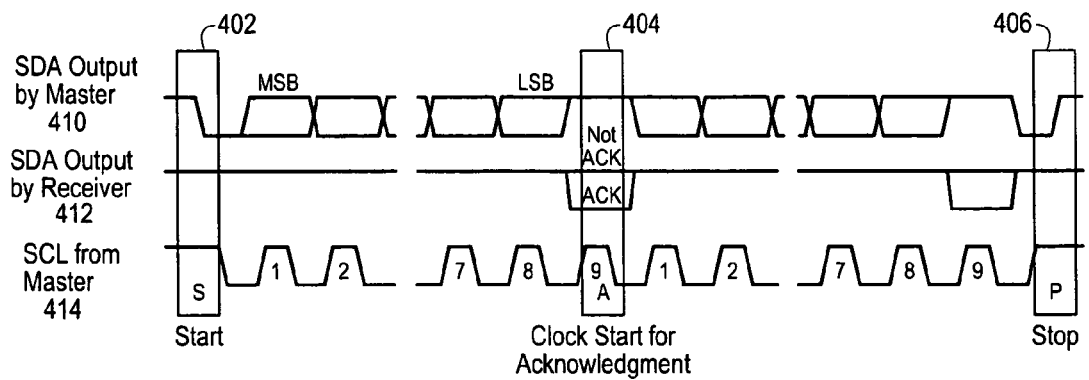
FIG. 4 shows the basic bus waveforms on the shared SDA and SCL bus wires of an I$^2$C bus, according to prior art.
Figure 5:
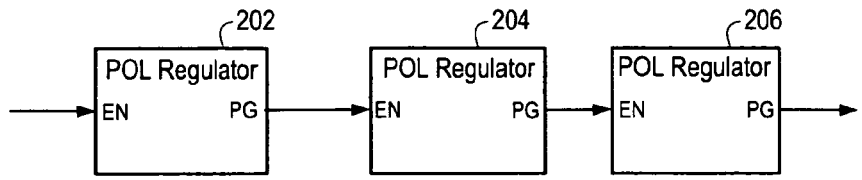
FIG. 5 shows one possible way of linking of POL regulators, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a device coupled to a bus that is "uniquely identified by an address" refers to a device identified by an address or addresses that are not shared with any other device that is also coupled to the bus. That is, the address that identifies a specified device does not identify any other device. However, more than one address may uniquely identify a single device. For example, a device may be uniquely identified by address '34ef45' and also by address '34ef44', but neither '34ef45' nor '34ef44' may identify any other device. Furthermore, "targeting an address" during a bus operation refers to initiating the bus operation addressing a device uniquely identified by the address. For example, if a first device coupled to the bus has a specified first address that uniquely identifies the first device, and a second device initiates a write operation "targeting the specified first address", then the address information transmitted by the first device as part of initiating the write operation is the specified first address. Furthermore, the terms "bus operation" and "bus transaction" are used interchangeably.

In one set of embodiments, a power management system may be configured with POL regulators coupled together over a bus, and digital information corresponding to sequencing and fault spreading passed between the POL (point-of-load) regulators employing a standard multi-master multi-slave interface, for example an I²C bus interface or SMBus interface. Each POL regulator may be statically configured during manufacturing or via pin strapping, and coupled to a bus (e.g. a serial data bus), where it may monitor bus transactions initiated by other similar POL regulators. In some embodiments the POL regulators may also be dynamically configured over the bus. Each POL regulator may respond to the bus transactions—which may be considered to be bus events—initiated by other POL regulators, thereby enabling event based sequencing and fault spreading according to each POL regulator's configuration and any given bus transaction or bus event. When coupled to a standard multi-master multi-slave interface (e.g. an I²C bus interface or SMBus interface), the POL regulators may report information to multiple other POL regulators while maintaining compatibility with non-POL regulators also connected to the bus.

In one set of embodiments, a power management system may be configured with a multi-master multi-slave bus having a pre-existing bus protocol and coupling multiple POL regulators together. The behavior of the multiple POL regulators may be coordinated via a transmission technique using the pre-existing bus protocol, enabling event-based sequencing and fault spreading without requiring central and/or direct control of the POL regulators. During sequencing, for example, the exchanged information may have a single origination point—a master POL regulator—and multiple destination points—slave POL regulators. The POL regulators may be configured with respective serial bus interfaces so that each POL regulator may receive all event transmissions within a defined group to which the POL regulator may belong. A group definition may be automatic, and group membership may be conveyed by the configuration of a POL regulator's address.

Figure 6:
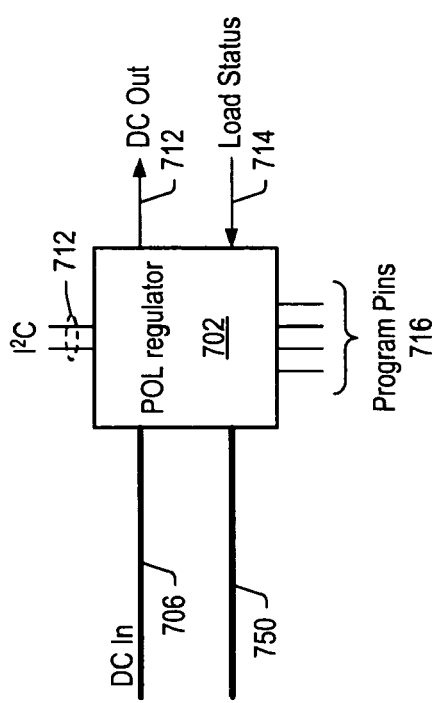
FIG. 6 illustrates the interface terminals of a multi-function POL regulator configured according to one embodiment.

An example of a POL regulator that may deliver information to, and receive information from a load and/or other POL regulators via an interface that is adapted for multi-functionality is illustrated in FIG. 6. As shown in FIG. 6, one possible way in which POL regulator 702 may be configured is through program pins 716. Various aspects of sequencing and fault spreading may be programmed into POL regulator 702 via pinstrapping, using program pins 716. For example, an address identifying POL regulator 702 may be programmed by tying select ones of program pins 716 either to a high voltage, to a low voltage, and/or to a pull-up/pull-down resistor, and/or by leaving select pins floating, that is, unconnected. It should be noted that in alternate embodiments, the configuration information may also be programmed into the POL regulators during manufacturing, or dynamically via bus 750. POL regulator 702 may also be incorporated into previous systems due to its ability to interface with I²C bus 712. In addition, the functionality of the bus corresponding to bus line 750 may also be adapted within the I²C bus protocol, and each POL regulator may be configured accordingly. In one set of embodiments, I²C bus 712 may also be used to configure POL regulator 702 in lieu of using program pins 716, as mentioned above.

Transmission of all events may be configured by a single bit to allow or inhibit event transmissions, as the ability to turn off an event transmission may be crucial in applications where the external master may not permit multi-master operation on the serial bus. In one set of embodiments, sequencing configuration may be flexible, allowing any group member to be either a prequel or a sequel device for any other group member. A single configuration bit may be used to enable or inhibit the fault spreading response within a POL regulator. Overall, collective fault spreading behavior may implicitly follow hardware fault responses. Furthermore, fault spreading may not require "discovery" of who the group members are, or the explicit establishment of a group of participating devices. Event communication may occur within groups of devices. Group membership may be established in a variety of ways. In some embodiments, group membership may be a function of a POL regulator's base address associated with the bus to which the POL regulators are coupled. Group members may differ only in a defined few address bits (e.g. 3, optionally 4 or more address bits as required).

As illustrated in FIG. 6, the interface of each POL regulator may be configured to couple to one or more communication buses as required. In one set of embodiments, the POL regulators may be coupled together via I²C bus for system level monitoring and control. Typically, the I²C bus and other similar busses do not inherently support transactions that require addressing multiple devices coupled to the bus at once without addressing all the devices coupled to the bus, and/or transactions for which the originating device needs to be identified. Transactions for multiple destinations in general may be performed on an I²C bus via a general broadcast transaction, but a general broadcast transaction used for performing power management functions such as sequencing and/or fault spreading may not be compatible with other (non-POL) devices that may also be coupled to the I²C bus. In addition, while the originator of a transaction may be identified through including an identifier data byte in the transaction, such inclusion may come at the cost of additional bus traffic and may therefore lead to higher bandwidth requirements. Furthermore, the inclusion of an identifier byte in the packet may not solve the issue of addressing a selected group of POL regulators.

Figure 7:
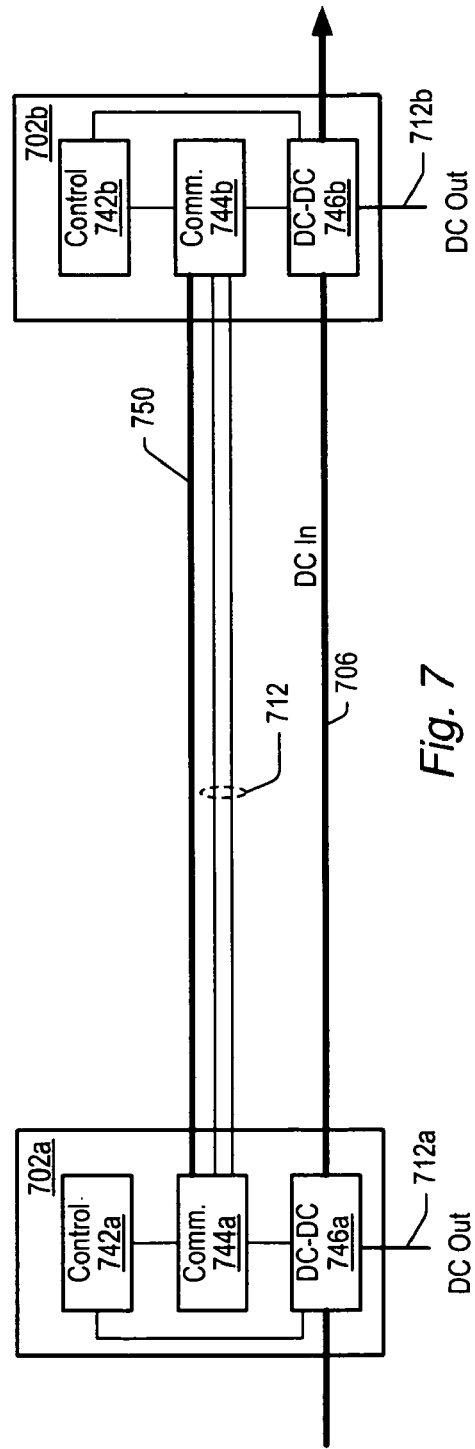
FIG. 7 illustrates the interface terminals of a Local Controller configured according to one embodiment.

FIG. 7 shows one embodiment of two POL regulators 702a and 702b coupled together via serial bus 750, and/or I²C bus 712. As also shown in FIG. 7, POL regulator 702a may include control logic 742a, communication logic 744a and a DC-DC converter 746a. Similarly, POL regulator 702b may include control logic 742b, communication logic 744b and a DC-DC converter 746b. A common power distribution bus 706 may carry the DC input voltage to the DC-DC converters 746a and 746b. It should be noted, that in alternate embodiments, POL regulators 702a and 702b may each include an AC-DC converter instead or in addition to the DC-DC converters shown, with an appropriate AC power distribution bus providing the AC input voltage to each AC-DC converter. Communication logic 744a and 746a may comprise circuitry implementing the communication protocols that may be used for POL regulators 702a and 702b communicating with each other via serial bus 750 and/or I²C bus 712. While FIG. 7 explicitly shows communication logic 744a and communication logic 744b being adapted to couple to the two buses shown, alternative embodiments may comprise communication logic configured to interface to only one of the buses, or to additional buses as well. Control logic 742a and 742b may comprise circuitry implementing control functions, such as sequencing and fault spreading, that may be performed by POL regulators 702a and 702b, including controlling respective DC output voltages 721a and 712b. As FIG. 8 also illustrates, multiple POL regulators similar to POL regulators 702a and 702b may be coupled together via the I²C bus, and/or serial data bus 750, and/or via other selected bus or buses. Though not illustrated in FIG. 8, other, non-POL devices may also be coupled to bus 750.

Figure 8:
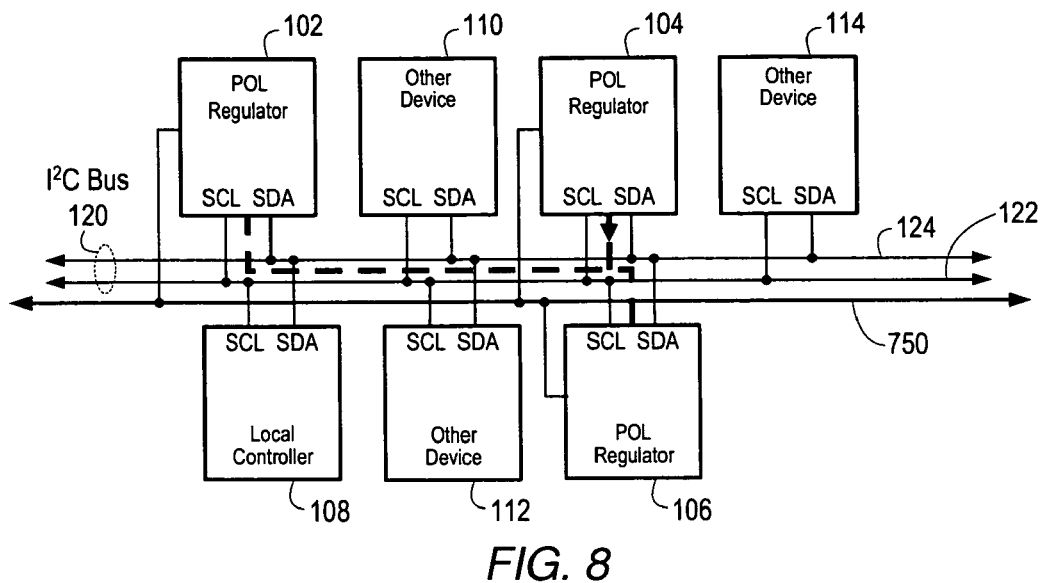
FIG. 8 shows one embodiment of a system configured with POL regulators, non-POL devices and a local controller coupled to an I²C bus, where a transmitting POL regulator is designated as a master POL regulator during information transfer between POL regulators.

As shown above, various embodiments of a power management system may be configured with POL regulators (such as the POL regulator shown in FIG. 6) coupled together as shown in FIGS. 7 and 8, for example. Referring to FIG. 6, each POL regulator may be configured using program pins 716 to set various parameters, control values, and/or default values relating to the controlled voltage output of the POL regulator, as well as to sequencing and fault spreading. Then, each POL regulator may simply be coupled to a bus (e.g. I²C bus or a serial bus) with other POL regulators, the POL regulators functioning together as network of devices upon system power-up, without requiring any further adjustments. In one sense, each POL regulator may be configured as a "plug & play" device, in that once it is plugged into the network of POL regulators, it may begin functioning as part of the power management system. As configured via pin-strapping, each POL regulator may be enabled to monitor information and packets that have been transmitted onto the bus (e.g. bus 750 and/or the I²C bus, or any selected bus configured to couple the POL regulators together), and perform sequencing and/or fault spreading according to the pin-strapping configuration and the monitored information.

In one embodiment, the POL regulators may communicate with each other using a multi-master/multi-slave bus architecture. Information may be identified as having originated from a given POL regulator and may be distributed to multiple destinations by allowing the originating POL regulator to effectively transmit the information to itself. For example, a given POL regulator having address 0×01 may transmit its measured output voltage to other POL regulators on the bus by performing a bus write, where the target address for the bus write is the given POL regulator's own address. For a possible structure of the POL regulator(s) shown in FIG. 7—considering for example POL regulator 740a—a register or registers may be configured as part of either control logic 742a or communication logic 744a, to store the POL regulator's address. The write operation itself may not necessarily occur, given that the POL regulator may act as the bus master to send the packet, and may therefore not need to respond as a slave to its own address within the packet. By performing a bus write in which a given POL regulator may be sending the packet to its own address, the source of the data (e.g. address 0×01) may be identified by any slave device (e.g. POL regulators configured to voltage track device 0×01) needing to receive the data from the bus during the transaction.

When no two devices are allowed to share a bus address, it is safe for a given device to initiate bus operations using the given device's address as the target address for the bus operations (e.g. the given device performing a write to its own address) without the risk of bus failure or contention. Since devices not associated with power delivery (that is, non-POL devices) may be configured to simply ignore such bus operations, this method of transferring information to a set of POL regulators would remain compatible with non-power (or non-POL) devices. Furthermore, in addition to having its own respective assigned bus address, each POL regulator may be assigned or configured with one or more other addresses or address groups. The additional addresses may define one or more POL regulator groups, enabling specialized group data exchange that may be required by sequencing and/or fault spreading. The additional address, addresses, or address groups may be used to receive data transmitted onto the bus by a POL regulator acting as bus master, and for other POL regulators to recognize the identity of the master POL regulator. Such configuration or configurations are compatible with normal features of already existing buses (and corresponding bus protocols) such as the I²C and System Management Bus (SMBus) for example, both of which allow for bus arbitration and clock stretching as potentially required by the master and slave devices. Each POL regulator may be configured with an additional assigned address or addresses that are uniquely different from a respective address used by a local controller, which may also be coupled to the bus, to address a given POL regulator. The additional addresses may be used exclusively for implementing a select set of features (e.g. sequencing and/or fault spreading) in which case the use of these additional addresses may uniquely distinguish the group communication packets corresponding to that set of features from conventional bus traffic originated by the local controller.

In one embodiment, each POL regulator required to transfer information to other POL regulators first becomes the bus master to initiate a transmission, which the transmitting POL regulator may begin by transmitting its own address (following a 'start bit' in some embodiments.) FIG. 8 illustrates one example of a POL regulator transmitting a packet to the bus, and that packet being received by other POL regulators coupled to the same bus. As shown in FIG. 8, a packet transmitted by POL regulator 104 is monitored and received by POL regulators 102 and 106. The packet transmitted by POL regulator 104 may be accessible by all other devices coupled to bus 120, including non-POL devices 110, 112, and 114. However, POL regulators 102 and 106 may be the only devices configured to recognize the packet and accept the data from POL regulator 104. In addition to their own respective addresses, POL regulators 102 and 106 may also be configured to recognize the respective address of POL regulator 104, enabling them to respond to any packet addressed to POL regulator 104. Thus, when POL regulator 104 transmits a packet to itself, POL regulators 102 and 106 may also recognize that packet.

In one embodiment, POL regulators may be configured with an I²C, SMBus, or other shared bus interface (for example bus 750 in FIG. 8) in a novel POL regulator design. Each POL regulator may include at least two slave address registers. The slave address registers may support concurrent comparisons with an address contained in a packet transmitted onto the bus. If the address in the packet results in a match for either of the slave address register values, the POL regulator may recognize the address and may respond to the packet, receiving data written by the master POL regulator if the packet indicates a write operation writing data to the slave POL regulator that recognizes the address, and providing data to the master POL regulator if the packet indicates a read operation reading data from the slave POL regulator that recognizes the address.

Figure 11:
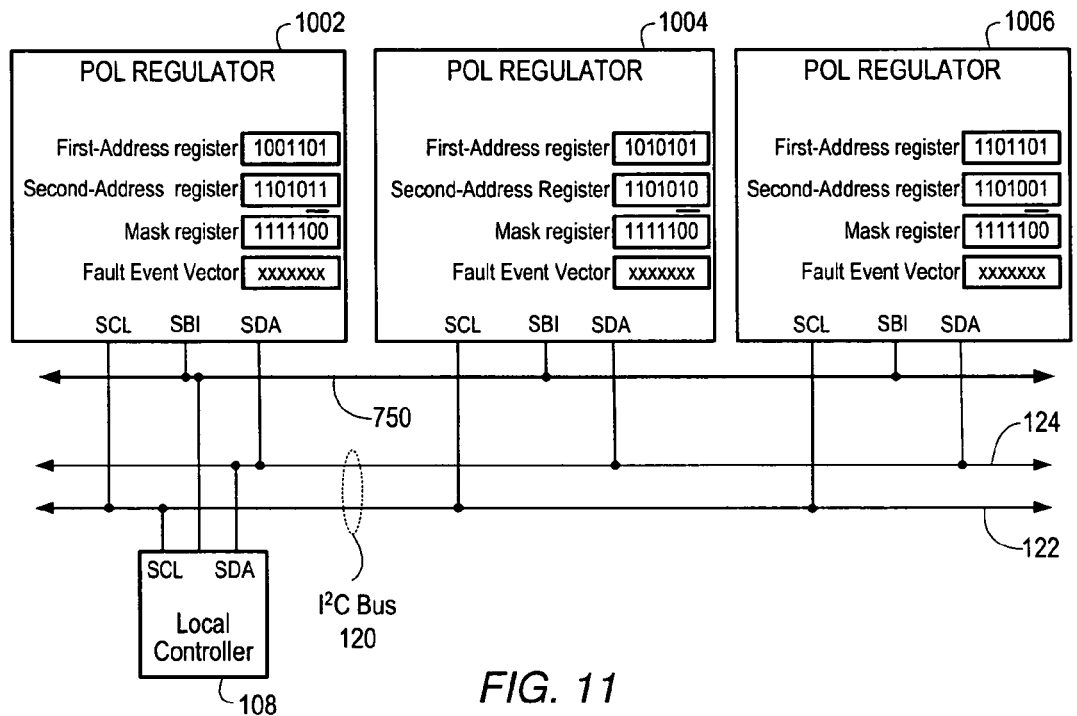
FIG. 11 shows one embodiment of a system configured with POL regulators coupled to an I²C bus, where each POL regulator is configured with multiple address registers.

FIG. 11 shows one embodiment of a group of slave address and mask registers that may be configured in POL regulators 1002, 1004, and 1006. The First-Address register may be programmed with a slave address uniquely identifying the POL regulator in which the First-Address register has been configured. For example, the First-Address register in POL regulator 1002 may be programmed with an address ('1001101' in FIG. 11) that uniquely identifies POL regulator 1002. POL regulators 1004 and 1006 may similarly be identified by the unique addresses programmed in their respective First-Address registers. The unique respective slave address thus assigned to each respective POL regulator may be used by local controller 108, which may also be coupled to I²C bus lines SDA 124 and SCL 122, (as well as to bus 750, to which the POL regulators may also be coupled via a serial bus interface (SBI) connection) when addressing any one or more of POL regulators 1002, 1004, and 1006 for status and/or control purposes. It should be noted that while only three POL regulators are shown for illustrative purposes in FIG. 11, more or fewer POL regulators may be coupled to I²C bus 120 and/or to bus 750 as required. Also, another shared bus other than (or in addition to) I²C may be used, for example an SMBus.

Referring again to FIG. 11, the Second-Address register may be programmed with a second unique respective slave address for POL regulators 1002, 1004, and 1006. In one set of embodiments, a respective Mask register may be associated with each Second-Address register. The bits in the Mask register may modify the address recognition function performed with the Second-Address register. For example, bits in the Mask register that are set to logic '1' may identify corresponding bits in the Second-Address register that must match the corresponding bits in the packet address for the address programmed into the Second-Address register to be recognized as a matching address. Bits in the Mask register that are set to logic '0' may identify corresponding bits in the packet address that do not have to match corresponding bits in the Second-Address register for the packet address to be recognized as a match for the address programmed into the Second-Address register. The '0' bits in the mask register may therefore correspond to a set of bits that identify devices within a group of addresses, and all addresses in that group may constitute a match for an address programmed into the Second-Address register.

For example, if the seven address bits in the Second-Address register are '1101011', as shown for POL regulator 1002 in FIG. 11, and the seven bits of the Mask register are '1111100', as also shown for POL regulator 1002, a group of four addresses may be defined. These four addresses may be '1101000', '1101001', '1101010' and '1101011'. The two LSBs may identify the given POL regulator (that includes the given Second-Address register) within the address group identified by the five MSBs of the address bits in the Second-Address register. Thus, the two LSBs may have any value as long as the five MSBs match, to result in the POL regulator responding to a given address received in a data packet. The four addresses in the example above may be assigned to individual POL regulators 1002, 1004, and 1006, as exemplified by '1101010' being programmed into the Second-Address register of POL regulator 1004, and '1101001' being programmed into the Second-Address register of POL regulator 1006. Each of POL regulators 1002, 1004, and 1006 in the group may use the address programmed into their respective Second-Address registers when sending a transmission packet to the group, where every other POL regulator in the group may consequently recognize the address as matching the masked programmed address in its respective Second-Address register, and accept the packet as a group transmission. In addition, the full, unmasked address contained within the packet may uniquely identify which member of the group was the originating device.

It should be noted that the number of bits within an address register and the number of address registers within each POL regulator were selected for illustrative purposes, and alternative embodiments may be configured with buses featuring packet sizes other than one byte, and may include more or less than two address registers and one mask register, where an address register and/or mask register may be configured with more or less than seven bits. Furthermore, address groups may be defined by specified address ranges, in which case mask registers may not be required for configuring each POL regulator's address recognition function. Referring back to POL regulator 702a in FIG. 7, for example, control logic 742a or communication logic 744a may be configured to perform the address recognition based on a specified address range. That is, either logic block may be configured to recognize any of the four addresses '1101000', '1101001', '1101010' and '1101011'—to use the example provided above—as being part of the same address group, and thus have an address match, should the address received in the packet transmission be any one of those four addresses.

Figure 9:
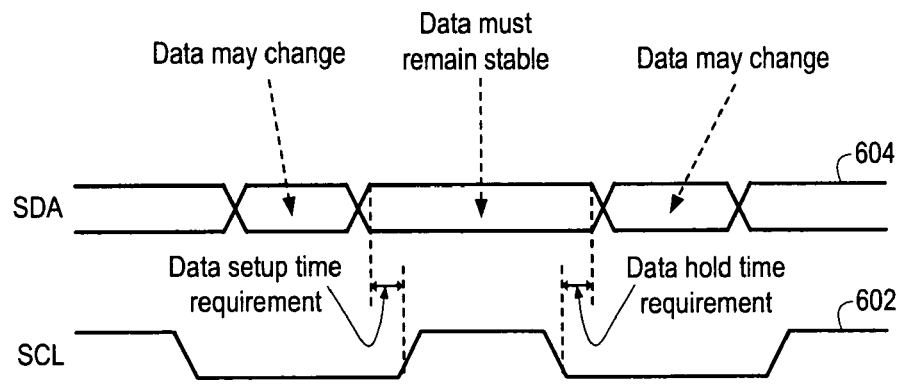
FIG. 9 shows a timing diagram illustrating data setup and hold time requirements for regular data transfer over I²C bus.

Synchronous bus architectures typically distribute a clock signal and one or more data signals. Each pulse on the clock signal may trigger the transfer of one bit of information on the data signals. In the case of the I²C bus, the data signal SDA 604 may transition to the next bit value to be transmitted after each falling edge of the clock signal SCL 602, as shown by an exemplary timing diagram in FIG. 9. According to the I²C bus standard, data transitions on SDA line 604 may occur only while SCL signal 602 resides in a low state, and the data must remain stable while SCL 602 resides in a high state, as also illustrated in FIG. 9. SDA 604 transitions that occur while SCL 602 resides in a high state may be used to define the "start" condition and "stop" condition for the bus protocol. According to the I²C bus standard, the "start" and "stop" conditions may be generated by the bus master, and are used to start and end transmission of a packet on the bus.

Figure 10:
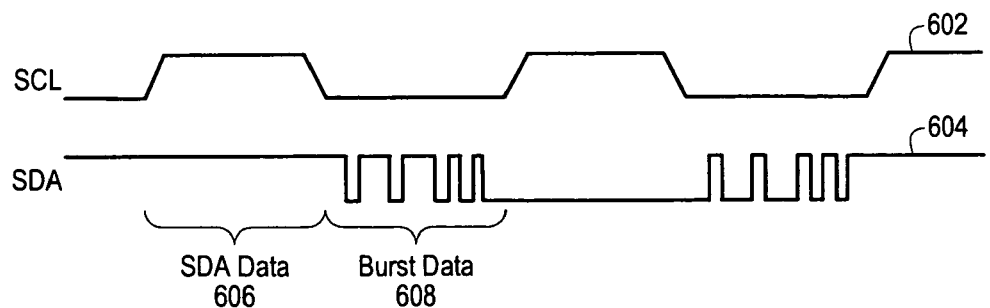
FIG. 10 shows a data burst transfer on the SDA signal bus according to one embodiment.

Standard devices on a bus like the I²C bus are generally configured to ignore transitions on SDA line 604 while SCL signal line 602 resides in a low state. The clock rate typically used in such systems may be relatively low. Furthermore, the I²C specifications and related SMBus specifications include clock stretching capability, that is, where both master and slave devices may be able to extend the time period during which SCL signal 602 resides in a low state. Therefore, data traffic may be embedded on SDA line 604 even while SCL signal 602 resides in a low state. In one embodiment, additional data is transmitted in bursts on the data line (SDA) while the bus clock (SCL) resides in its low state. As illustrated in FIG. 10, SDA data 606 may be stable while SCL signal 602 resides in a high state, as required by the I²C bus specification, for example. The data transitions of burst data 608 on SDA signal line 604 may be ignored by other devices, as data burst 608 occurs while SLC signal line 602 resides in a low state. In other words, a POL regulator may transmit a burst of data on SDA signal line 604, following a falling edge on SCL signal line 602. The POL regulator may be configured to guarantee that the burst has been completed by the next rising edge on SCL signal line 602 by employing the clock stretching capability of the bus, thereby meeting the setup and hold times requirements set forth in the bus specification (and also illustrated in FIG. 9). Legacy devices, that is, devices not configured to operate according to the device-to-device transmission technique used by the POL regulators as described above, and therefore not able to recognize the data bursts, would operate normally. However, a POL regulator designed to receive and interpret the data bursts may use standard clock recovery techniques to decode and use the burst data.

In one set of embodiments, the bus addresses assigned to the POL regulators (e.g. as shown in FIG. 11) may be used as part of the operational configuration of the POL regulators. For example, the numerical order of the respective slave addresses programmed into each respective Second-Address register of a group of POL regulators—shown in FIG. 11, for example—may also be used to establish the sequencing order of the POL regulators that are part of the group. In other words, the numerical order of the assigned addresses may correspond to the order in which the POL devices are either enabled or disabled. Also, the respective slave address of a POL regulator may be selected to establish the phase offset of the POL regulator during a switching cycle. When configuring a POL regulator, the address of the POL regulator may be selected such that the POL regulator is enabled to recognize its own place within a switching cycle by examining the address that it has been assigned. For example, by examining its assigned address, a POL regulator may determine that it is the third in a sequence of four POL regulators. In general, any number of features of a POL regulator may be configured through bus address assignments.

Figure 12A:
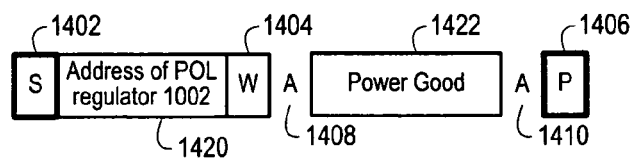
FIGS. 12*a* and 12*b* show two possible embodiments of a packet structure for a POL regulator issuing its own respective "power good" event during sequencing.
Figure 12B:
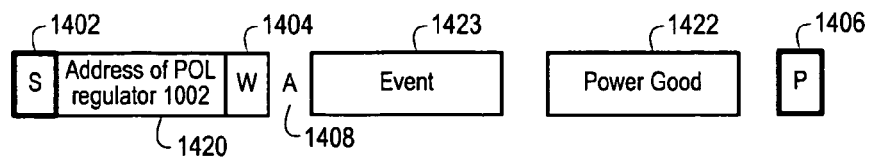

Sequencing and fault spreading may also be implemented using the group address recognition capability described above. Referring again to FIG. 11, a group of four/eight/sixteen/etc. device addresses may be recognized by masking off specific bits of each respective second-address register. As previously mentioned, each POL regulator may be configured (e.g. via pin-strapping) and coupled to a selected bus, where it may begin monitoring the bus for data packets, and respond to the packets at least according to the address recognition function described above. Power sequencing functionality, for example, may be implemented by configuring any or all POL regulators coupled to the bus to enable their output subsequent to a transmitting (master) POL regulator having issued its own respective "power good" event, as illustrated in FIGS. 12a and 12b. The packets shown in FIGS. 12a and 12b may represent a POL regulator, for example POL regulator 1002 from FIG. 11, transmitting its "power good" event tag to the bus, such as I²C bus 120 or bus 750 in FIG. 11.

FIG. 12a illustrates one embodiment of a packet structure that may be used during sequencing. In FIG. 12a, as part of first data byte 1420, POL regulator 1002 may transmit its own unique address, identifying itself as the originating device, with the "power good" tag following in data byte 1422. A 'start' bit 1402 may indicate the beginning of packet transmission, followed by the address of the transmitting POL regulator (in this example POL regulator 1002). The first byte may end with a status bit 1404 indicating a bus write in the example shown. The transmitting POL regulator may then acknowledge the address, as illustrated with acknowledge bit 1408, in effect acknowledging its own address since the transmission was addressed to the transmitting POL regulator itself. POL regulator 1002 may then transmit the "power good" event 1422, followed by acknowledgement 1410 of the event, and a transmission end bit 1406. It should be noted that acknowledgement bit 1410 may not be required, and alternate embodiments of the packet structure may in fact omit acknowledgement bit 1410. Other POL regulators that have been previously configured, for example POL regulators 1004 and 1006 (also of FIG. 11) may detect the "power good" event on the bus, and may respond accordingly. POL regulators 1004 and 1006 may each transmit their own respective "power good" event on the bus in a similar fashion when appropriate.

FIG. 12b illustrates another embodiment of a packet structure that may be used during sequencing. In this embodiment, the packet structure may be designed to be compatible with an already existing bus protocol, for example with PMBus (Power Management Bus) specification/functionality. For example, a given bus protocol (such as the PMBus protocol) may be configured to have an initial address within a transmission packet be followed by a "command" byte/code identifying the type of the bus packet. Packet types may reference operational values or may cause changes in the active state of the addressed device. According to the embodiment of FIG. 12b, a specific command code labeled "event" may be reserved within a previously defined command set that corresponds to the selected (used) bus protocol, to designate a power management type packet. The "event" command may thus be used to designate packets transmitted to facilitate power management functions, for example sequencing and/or fault spreading event packets. The packet structure shown in FIG. 12a may then be modified to the packet structure show in FIG. 12b, with the transmitting POL regulator first indicating that the packet is a power management type packet by transmitting "event" command 1423 before transmitting its "power good" event 1422. As also shown, in this embodiment only the address may need to be acknowledged (acknowledge bit 1408) during transmission, while the command and event type following the command may not be required or expected to be acknowledged. A "power down" event may similarly be implemented, with the "power good" event type being replaced in each case with a "power down" event type. By thereby filtering "power good" and "power down" events using defined prequel and sequel addresses, the acceptance of those events may be limited to only those relevant to each POL regulator's sequencing configuration.

Fault events transmitted by any POL regulator belonging to a designated address group may be recognized and managed in a fault event vector (FEV) configured within each POL regulator belonging to the designated address group, as shown for example in FIG. 11. In one set of embodiments, each bit in the vector may represent a member of the designated address group. For example, if the 'x' within the FEV—as shown in FIG. 11—represents a bit, the position of each bit may correspond to a designated POL regulator. For example, the LSB position in the FEV may correspond to POL regulator 1002, the second to LSB position may correspond to POL regulator 1004, and so forth. When a POL regulator that's a member of the designated address group transmits a fault event, the bit corresponding to the transmitting POL regulator may be set in the vector. When a POL regulator transmits a retry event, the bit corresponding to the POL regulator may be cleared in the vector. For example, if POL regulator 1002 transmits a fault event to bus 750 or I²C bus 120, POL regulators 1004 and 1006 may set the LSB in their respective FEVs. Similarly, if 1002 regulator transmits a retry event, POL regulators 1004 and 1006 may clear the LSB in their respective FEVs. In one set of embodiments, if any bit in the FEV is set, the POL regulators in the designated address group may shut down until the vector is cleared. While FIG. 11 shows one FEV configured for one address group in each POL regulator, alternate embodiments may be of a power management system in which certain POL regulators may be configured in multiple address groups and may include respective FEVs for each address group to which the POL regulators belong. For example, a POL regulator may be comprised in two address groups, and may include separate FEVs corresponding to each address group. Address groups may also be configured as being overlapping and/or non-overlapping, that is, a given POL regulator may or may not be configured in more than one address group.

In one set of embodiments, a POL regulator detecting a primary hardware fault may transmit its fault status onto the bus. All POL regulators in the group may monitor all packets transmitted from other POL regulators from the same group, thereby eliminating the need to echo faults to spread them along a chain. Limiting fault spreading to a sequencing chain may therefore also be eliminated. The address group may be defined to be large enough to include all POL regulators that were designated to spread faults mutually. There may be multiple sequencing chains (or no chains) within the address group. In one set of embodiments, a given sequencing chain may be part of a single group. Once fault spreading has been enabled, a POL regulator may have to recognize fault events transmitted by any one or more of all other POL regulators in the group. However, in certain embodiments, the POL regulators may be divided into separate, and therefore non-interacting groups, which may provide additional configuration options resulting in reduced response latency for fault spreading.

Fault spreading operation according to one embodiment will now be described in more detail. As previously mentioned, the full address of each recognized event may be used to interpret a fault event transmission, and a FEV may be maintained by each POL regulator of the group to record the fault status of all other POL regulators of the group. With the introduction of the "retry event" used to clear the bits in the FEV, the fault response discipline may be implicitly spread to the entire group. When a POL regulator recognizes a hardware fault that may cause it to disable its output (and/or shutdown, and/or take any other previously determined/configured action), it may transmit a fault event onto the bus. This fault event transmission may not be addressed to any other POL regulator, yet all the POL regulators in the group may recognize the event and set the group fault vector bit corresponding to the originating POL regulator in their respective FEVs. For example, as shown in FIGS. 13a and 13b—referencing the exemplary system (which may be part of a larger power management system) shown in FIG. 11—POL regulator 1002 may detect a hardware fault and transmit a packet onto data bus 750 and/or I²C bus 120.

Figure 13A:
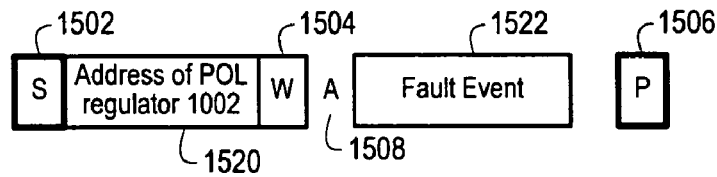
FIGS. 13*a* and 13*b* show two possible embodiments of a packet structure for a POL regulator issuing a fault event during fault spreading.
Figure 13B:
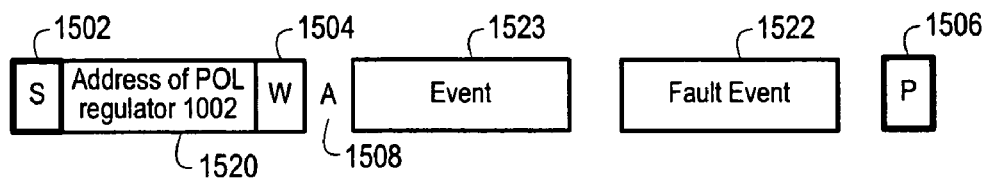

As shown in FIG. 13a, one embodiment of the packet may begin with start bit 1502 followed by the address of POL regulator 1002 (1520) and a status bit 1504 indicating a bus write. Upon acknowledging its address in form of acknowledge bit 1508, POL regulator may transmit a "fault event" type 1522, and an end transmission bit 1506. (Note that in alternate embodiments the "fault event" type itself may be acknowledged in form of an acknowledge bit preceding end transmission bit 1506, similar to the example shown for a "power good" event type in FIG. 12a). In an alternate embodiment shown in FIG. 13b—similar in structure to the embodiment of the sequencing packet structure shown in FIG. 12b—the transmitting POL regulator may transmit an "event command" 1523 prior to transmitting "fault event" type 1522. Upon receiving address 1520 and fault event type 1522, POL regulators 1004 and 1006 may set the LSB (which is the bit position that corresponds to POL regulator 1002 in each FEV—in other embodiments, any one of the bit positions within the FEV may be configured to correspond to POL regulator 1002) in their respective FEVs. In one embodiment, all POL regulators in the group may disable their respective voltage outputs upon having set the group fault vector bit.

As mentioned above, the transmitting POL regulator may acknowledge its own address as a result of having addressed itself in initiating a transmission. This may enable the POL regulator to operate on the bus according to a pre-existing bus protocol that may require each addressed device to acknowledge its address during a bus transaction. Examples of such bus protocols include the SMBus and I²C specifications. By operating within the established specifications of such bus protocols, a coincidental transmission by an external controller (such as local controller 108 in FIG. 11) directed to the master POL regulator may be arbitrated and resolved during transmission of "event command" 1523. The local controller may send one command while the POL regulator transmits "event command" 1523, and whichever command has numerically the lowest binary value may win arbitration. The losing device may withdraw from transmission and try again later when the bus is again idle.

Figure 14A:
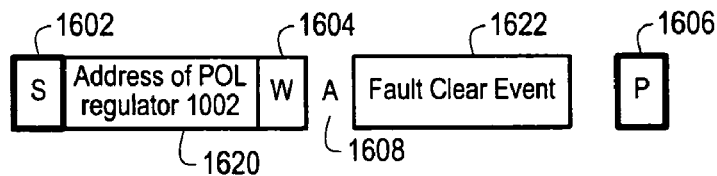
FIGS. 14*a* and 14*b* show two possible embodiments of a packet structure for a POL regulator issuing a fault clear event during fault spreading.
Figure 14B:
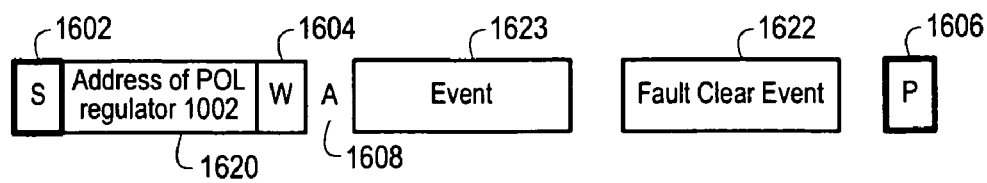

If the fault response state of the POL regulator that recognized the hardware fault (in the example above POL regulator 1002) is such that the POL regulator should retry, it may transmit a fault clear event, as shown for example in FIGS. 14a and 14b. As shown in FIG. 14a, by way of example, POL regulator 1002 may transmit a fault clear event packet, which may begin with start bit 1602, followed by the address of POL regulator 1002 (1620) and a status bit 1604 indicating a bus write. Upon acknowledging its own address by way of acknowledge bit 1608, POL regulator may transmit a "fault clear event" type 1622, and an end transmission bit 1606. (Note again that in alternate embodiments the "fault event" type itself may be acknowledged in form of an acknowledge bit preceding end transmission bit 1606, similar to the example shown for a "power good" event type in FIG. 12a). In an alternate embodiment shown in FIG. 14b—similar in structure to the embodiment of the fault event packet structure shown in FIG. 13b—the transmitting POL regulator may transmit an "event command" 1623 prior to transmitting "fault clear event" type 1622. Upon receiving address 1620 and fault clear event type 1622, POL regulators 1004 and 1006 may clear the LSB (or whichever bit corresponds to POL regulator 1002) in their respective FEVs. The group may then retry, and sequencing chains in the group may retry according to previously established sequencing rules.

In one set of embodiments, if the fault response state of POL regulator results in the POL regulator leaving its voltage output disabled, or shutdown, all POL regulators in the group may also keep their respective voltage outputs disabled, or shutdown, until the primary fault condition has been processed, and a fault clear event is transmitted to the group, or the entire group may be disabled and re-enabled by an external controller or other means. In case multiple hardware faults are detected within a group, the POL regulators may set multiple bits in their respective FEVs, with the bits corresponding to all the POL regulators that have detected hardware faults, transmitting respective fault events to the bus as a result. Each transmission may occur as exemplified in FIG. 13. POL regulators in the group may be inhibited from retry until all the bits in their respective FEVs have been cleared.

In one set of embodiments, in order to minimize firmware cost (i.e. code size), a fixed group size may be designated, for example a group of 8 devices. That choice may be convenient since the fault vector may thus fit in a single byte. Another convenience for implementation may be to configure the unique address bits of the POL regulators of a group to be the LSBs of the bus address (as shown for example in FIG. 11, where the LSBs of each second-address register may be masked out to designate the address group). This may simplify address manipulations used in managing the FEV. Those skilled in the art will appreciate, however, that the address recognition may be performed in a variety of ways, as also previously described, and that even in the event of using a mask register, bits other than the LSBs may be masked out. As an additional safeguard against lost events, the FEV may be cleared when the POL regulator is disabled (e.g. by its 'enable' pin input or other command). For loss of "power down" sequencing events, a timeout may be started when a POL regulator's "enable" negates, if the POL regulator is dependent on a sequel device to power down. The timeout may guard against the loss of the "power down" (due to the possibility of communication failure) event from the sequel device.

In one set of embodiments, when configuring POL regulators to communicate with each other using a pre-existing bus such as an I²C bus or SMBus as described above, only a subset of the pins normally required for a standard implementation of the pre-existing bus may be needed. In other words, proprietary bus functionality embedded in the standard bus protocol of the utilized bus (to provide the required communication capabilities for power management functions) may be accomplished with fewer pins than what a standard bus interface for the utilized bus may require. For example, in case of applications that require an I²C interface only for implementing communications between POL regulators, a single pin, rather than two I²C pins, may be sufficient. Thus, a single-wire bus may be used to implement the necessary communication capabilities for power management functions on that pin. In addition, as previously mentioned, POL regulators may have multiple bus interfaces, as shown for example in FIG. 7, where communication blocks 744a and 744b are adapted to couple each POL regulator to both an I²C 712 bus and bus 750. Accordingly, POL regulators having multiple bus interfaces may be adapted to transmit/receive information/data to/from one bus and transmit/receive information/data to/from another bus.

It should also be noted that while the above examples presented a bus write as a means for transmitting information from one POL regulator to another, a bus read may be used in a similar manner to transfer the information. That is, the originating POL regulator may effectively read from itself. However, slave POL regulators in its group may need to be configured to recognize the master POL regulator's address without responding to the packet in the same manner in which they would respond to a conventional bus read from the local controller. In other words, the POL regulators may be required to not supply data in response to the read bit. This mode of operation may involve additional non-standard device behavior, and may introduce additional overhead in the packet by adding a repeated start signal and address to accomplish setting the read bit.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A system comprising:
a bus; and
a plurality of POL (point-of-load) regulators coupled to the bus, each of the plurality of POL regulators having a respective regulated voltage output and configured to transmit and receive information over the bus according to a bus protocol;
wherein at least a first POL regulator of any of the plurality of POL regulators is configured to initiate a first bus operation by transmitting onto the bus an address that uniquely identifies the first POL regulator, wherein the first bus operation comprises transmitting first information onto the bus indicating that the respective regulated voltage output of the first POL regulator is enabled if the respective regulated voltage output of the first POL regulator is enabled;
wherein at least a second POL regulator of the plurality of POL regulators is configured to receive the first information and the address that uniquely identifies the first POL regulator, and in response to receiving the first information and the address that uniquely identifies the first POL regulator, enable its respective regulated voltage output;
wherein the first POL regulator and the second POL regulator each maintains respective fault event data, wherein each respective fault event data is configured to indicate whether the first POL regulator and the second POL regulator have transmitted over the bus respective information indicative of a detected hardware fault;

wherein each of the first POL regulator and the second POL regulator is configured to update its respective fault event data when receiving information indicating a detected hardware fault transmitted onto the bus by the first POL regulator; and wherein each of the first POL regulator and the second POL regulator is configured to update its respective fault event data when receiving information indicating a detected hardware fault transmitted onto the bus by the second POL regulator.

2. The system of claim 1, wherein the second POL regulator is configured to initiate a second bus operation addressing the second POL regulator, wherein the second bus operation comprises transmitting second information onto the bus indicating that the respective regulated voltage output of the second POL regulator is enabled if the respective regulated voltage output of the second POL regulator is enabled.

3. The system of claim 1, wherein the first POL regulator, the second POL regulator, and a first subset of remaining ones of the plurality of POL regulators form a first group of POL regulators, wherein each one of the first group of POL regulators is uniquely identified by a respective address that is part of a first address-group.

4. The system of claim 3, wherein each POL regulator of the first group of POL regulators is configured to initiate a respective bus operation, wherein the respective bus operation comprises:

the initiating POL regulator transmitting its respective address onto the bus; and the initiating POL regulator transmitting onto the bus respective information indicating that the respective regulated voltage output of the initiating POL regulator is enabled if the respective regulated voltage output of the initiating POL regulator is enabled.

5. The system of claim 4, wherein the first address-group specifies a sequence of the first group of POL regulators.

6. The system of claim 5, wherein each POL regulator of the first group of POL regulators is configured to receive the respective address transmitted by the initiating POL regulator and the respective information transmitted by the initiating POL regulator;

wherein the receiving POL regulator is configured to determine whether it is next in the sequence of the first group of POL regulators, following the initiating POL regulator;

wherein the receiving POL regulator is configured to enable its respective output in response to the respective information transmitted by the initiating POL regulator if the receiving POL regulator has determined that it is next in the sequence of the first group of POL regulators, following the initiating POL regulator.

7. The system of claim 6, wherein the receiving POL regulator is configured to determine whether it is next in the sequence of the first group of POL regulators, following the initiating POL regulator, based on its respective address and the respective address transmitted by the initiating POL regulator.

8. The system of claim 4, wherein the respective address of each POL regulator of the first group of POL regulators corresponds to a respective position of the POL regulator within the sequence of the first group of POL regulators.

9. A system comprising;

a bus; and a plurality of POL (point-of-load) regulators coupled to the bus, each of the plurality of POL regulators having a respective regulated voltage output and configured to transmit and receive information over the bus according to a bus protocol;

wherein at least a first POL regulator of any of the plurality of POL regulators is configured to initiate a first bus operation by transmitting onto the bus an address that uniquely identifies the first POL regulator, wherein the first bus operation comprises transmitting first information onto the bus indicating that the first POL regulator has detected a hardware fault if the first POL regulator has detected a hardware fault; and wherein at least a second POL regulator of the plurality of POL regulators is configured to receive the first information and the address that uniquely identifies the first POL regulator, and in response to receiving the first information and the address that uniquely identifies the first POL regulator, disable its respective regulated voltage output;

wherein the first POL regulator and the second POL regulator each maintains respective fault event data configured to indicate whether the first POL regulator and the second POL regulator have transmitted over the bus respective information indicating a detected hardware fault;

wherein each of the first POL regulator and the second POL regulator is configured to update its respective fault event data when receiving information indicating a detected hardware fault transmitted onto the bus by the first POL regulator; and wherein each of the first POL regulator and the second POL regulator is configured to update its respective fault event data when receiving information indicating a detected hardware fault transmitted onto the bus by the second POL regulator.

10. The system of claim 9, wherein the first POL regulator, the second POL regulator, and a first subset of remaining ones of the plurality of POL regulators form a first group of POL regulators, wherein each one of the first group of POL regulators is uniquely identified by a respective address that is part of a first address-group.

11. The system of claim 10, wherein each POL regulator of the first group of POL regulators is configured to initiate a respective bus operation addressing the initiating POL regulator, wherein the respective bus operation comprises the initiating POL regulator transmitting onto the bus respective information indicating that the initiating POL regulator has detected a hardware fault if the initiating POL regulator has detected a hardware fault.

12. The system of claim 11, wherein each POL regulator of the first group of POL regulators is configured to receive the respective information transmitted by the initiating POL regulator and disable its own respective output in response to the respective information transmitted by the initiating POL regulator.

13. The system of claim 12, wherein each POL regulator of the first group of POL regulators maintains respective fault event data configured to store information indicating which POL regulators of the first group of POL regulators have transmitted respective information indicating a detected a hardware fault.

14. The system of claim 13, wherein each respective fault event data comprises a number (N) of bits, wherein N is greater than or equal to two, wherein each respective bit of the N bits corresponds to a different respective one of the first group of POL regulators and indicates whether the different respective one of the first group of POL regulators has transmitted information indicating a detected hardware fault.

15. The system of claim 14, wherein upon receiving the respective information transmitted by the initiating POL regulator, each receiving POL regulator of the first group of POL regulators is configured to set in its respective fault event data the respective bit corresponding to the initiating POL regulator.

16. The system of claim 15, wherein the initiating POL regulator is configured to initiate a respective new bus operation addressing the initiating POL regulator, wherein the respective new bus operation comprises the initiating POL regulator transmitting onto the bus respective new information indicating that the initiating POL regulator will attempt to enable its respective regulated voltage output.

17. The system of claim 16, wherein each POL regulator of the first group of POL regulators is configured to receive the respective new information transmitted by the initiating POL regulator and reset in its respective fault event data the respective bit corresponding to the initiating POL regulator.

18. The system of 17, wherein each POL regulator of the first group of POL regulators is configured to enable its respective regulated voltage output only if each of the N bits within its respective fault event data is cleared.

19. A system comprising:

a bus; and a first group of POL (point-of-load) regulators coupled to the bus, each of the first group of POL regulators having a respective regulated voltage output and configured to transmit and receive information over the bus according to a bus protocol;

wherein each of the first group of POL regulators is configured to transmit a fault event onto the bus, wherein the fault event is indicative of the transmitting POL regulator having recognized a hardware fault, wherein the fault event is not addressed to any other ones of the first group of POL regulators;

wherein each of the first group of POL regulators is configured to recognize the fault event and shut down its respective regulated voltage output in response to recognizing the fault event;

wherein each of the first group of POL regulators includes respective fault event data comprising a number (N) of bits wherein N is greater than or equal to two, wherein each one of the N bits corresponds to a different respective one of the first group of POL regulators; and wherein in response to recognizing the fault event each of the first group of POL regulators is configured to set in its respective fault event data the one of the N bits corresponding to the transmitting POL regulators.

20. The system of claim 19, wherein the transmitting POL regulator is configured to transmit a fault clear event onto the bus, wherein the fault clear event is indicative of the transmitting POL regulator attempting to enable its respective regulated output voltage, wherein the fault clear event is not addressed to any other ones of the first group of POL regulators;

wherein each of the first group of POL regulators is configured to recognize the fault clear event, wherein in response to recognizing the fault clear event each of the first group of POL regulators is configured to reset in its respective fault event vector data the one of the N bits corresponding to the transmitting POL regulator.

21. The system of claim 19, wherein each POL regulator of the first group of POL regulators is configured to enable its respective regulated voltage output only if each of the N bits within its respective fault event data is cleared.

* * * * *

UNITED STATES PATENT AND TRADEMARK OFFICE
CERTIFICATE OF CORRECTION

| | |
|---|---|
| PATENT NO. | : 7,685,320 B2 |
| APPLICATION NO. | : 11/435629 |
| DATED | : March 23, 2010 |
| INVENTOR(S) | : Wishneusky |

Page 1 of 1

It is certified that error appears in the above-identified patent and that said Letters Patent is hereby corrected as shown below:

Column 19
Line 59, please delete "The system of claim 4, wherein" and substitute -- The system of claim 5, wherein --.

Signed and Sealed this

Eighteenth Day of May, 2010

David J. Kappos
*Director of the United States Patent and Trademark Office*